United States Patent [19]

Poole et al.

[11] Patent Number: 4,909,549

[45] Date of Patent: Mar. 20, 1990

[54] COMPOSITION AND PROCESS FOR INFLATING A SAFETY CRASH BAG

[75] Inventors: Donald R. Poole, Woodinville; Michael A. Wilson, Bothell, both of Wash.

[73] Assignee: Automotive Systems Laboratory, Inc., Farmington Hills, Mich.

[21] Appl. No.: 278,848

[22] Filed: Dec. 2, 1988

[51] Int. Cl.$^4$ .............................................. B60R 21/08
[52] U.S. Cl. .................................. 280/738; 280/741; 149/2
[58] Field of Search ....................... 280/738, 741, 742; 149/2

[56] References Cited

U.S. PATENT DOCUMENTS

| | | | |
|---|---|---|---|
| 3,909,037 | 9/1975 | Stewart | 280/738 |
| 3,910,595 | 6/1971 | Katter et al. | 280/738 |
| 4,369,079 | 1/1983 | Shaw | 149/2 |
| 4,370,181 | 1/1983 | Lundstrom et al. | 149/2 |

*Primary Examiner*—Kenneth R. Rice
*Attorney, Agent, or Firm*—Lyon & Delevie

[57] ABSTRACT

Composition and process for inflating an automobile or aircraft safety crash bag comprising igniting a pyrotechnic composition to generate a gas which is admixed with air by means of an aspirating venturi which results in substantially non-toxic products which are thereafter utilized to inflate said crash bag.

17 Claims, No Drawings

COMPOSITION AND PROCESS FOR INFLATING A SAFETY CRASH BAG

BACKGROUND OF THE INVENTION

1. Field of the invention

This invention relates to a process for inflating a safety crash bag. 2. Description of the prior art In the prior art, the generation of nitrogen gas in order to fill an airbag for use as an aircraft or automobile safety crash bag has involved the use of azide compounds. Azide compounds such as sodium azide are highly toxic materials prior to combustion. Such azide salts also readily react with heavy metals such as copper, lead, etc. to form extremely sensitive solids that are subject to unexpected iginition or detonation and therefore require special handling in the manufacture, storage and disposal of such compounds.

Methods of generating nitrogen gas to fill a safety crash bag using metal salts of 5,5'-bitetrazole with oxidizers which contain no oxygen in the molecule are disclosed in U.S. Pat. No. 4,370,181 to Lundstrom et al. The prior art use of tetrazole compounds with oxygen containing oxidizers are dismissed in view of the fact that such compositions do not meet the present requirements for the generation of gases which are able to meet the industrial standards for toxicity with respect to such gases as carbon monoxide, carbon dioxide, etc. The disclosure of prior art non-azide nitrogen gas generants by Lundstrom et al are to various hydroxamine acid and hydroxylamine derivatives, various polymeric binders, hydrocarbons and carbohydrates which are oxidized to produce non-corrosive and, often termed, "non-toxic" gases. In addition, Lundstrom et al disclose as other approaches to non-azide nitrogen gas generants utilizing tetrazole compounds such as aminotetrazole, metal salts of aminotetrazole, or other tetrazole salts which contain hydrogen in the molecule. These are used in combination with oxygen containing oxidizers such as potassium perchlorate. Upon combustion, these compositions tend to form various toxic species such as hydrogen cyanide, nitrogen oxides, and carbon monoxide in unacceptable proportions so as not to meet the present toxicity requirements for the non toxicity of the gas generated.

In U.S. Pat. No. 4,369,079 to Shaw, solid, non-azide nitrogen gas generant compositions for inflation of a safety crash bag are disclosed as consisting essentially of a metal salt of a non-hydrogen containing a tetrazole compound in admixture with an oxidizer containing nitrogen. The specific tetrazole which is disclosed as useful is azobitetrazole.

In U.S. Pat. No. 3,910,595, an apparatus is described for aspirating air into a gas mixture used to inflate a crash restraint device.

SUMMARY OF THE INVENTION

A process is disclosed for inflating an airbag suitable for a number of purposes including use as a safety crash bag in aircraft or automobiles in which a primary source of gas is generated by the ignition of pellets prepared from a dry blend of a tetrazole or triazole compound and an oxygen containing oxidizer. By the method of the invention it is possible to obtain a substantially higher yield of gas for use in inflating the crash bag by the provision of passing the gas mixture generated upon combustion of said pellets through a venturi so as to aspirate outside air to form a gas mixture which is then used to inflate the crash bag.

The method of the invention overcomes the disadvantages referred to above in the discussion of the prior art relating to the use of certain non-azide gas generant mixtures consisting of tetrazole compounds such as aminotetrazole, triazole compounds such as 1,2,4-triazole-5-one, metal salts of aminotetrazole, or other tetrazole salts which contain hydrogen in the molecule in combination with oxygen containing oxidizers. While the gases produced upon combustion of such generant mixtures may contain higher amounts of toxic species of gases than are presently acceptable for use in inflating airbags, by the novel provison of diluting the primary source of gas (produced upon combustion) with a secondary source of gas (air), acceptable levels of the toxic species are obtained thus making such gas generants practical. Both tetrazole and triazole compounds are useful in the process of the invention. The useful tetrazole compounds include aminotetrazole, metal salts of tetrazole, other tetrazole salts containing hydrogen in the molecule, and metal salts of such hydrogen containing tetrazoles.

DETAILED DESCRIPTION OF THE INVENTION AND THE PREFERRED EMBODIMENTS

The present invention relates to a process for inflating a crash bag utilizing a mixture of a triazole or a tetrazole compound and an oxygen containing oxidizer. Upon combustion of this mixture a primary gas is formed which when passed through an aspirating venturi draws in outside air for use in cooling the primary source of gas and diluting the primary source of gas, thus reducing the toxicity of the primary source of gas below unacceptable levels and permitting the use of triazole or tetrazole compounds which have safety and toxicity advantages over the azide compounds used in the prior art.

A particularly unexpected aspect of the process of the invention is that certain tetrazole compounds when admixed, for instance, with an oxygen and chlorine containing oxidant compound, such as an alkali metal perchlorate, have been found to be incapable of sustaining combustion at ambient pressure, although these mixtures burn readily at elevated pressures. Generally, a pressure of about 100 psi to about 3000 psi, preferably, about 500 psi to about 2500 psi, and most preferably, about 750 psi to about 2000 psi is used. Thus, there is a substantial safety advantage in the use of such mixtures over the use of azide compounds, such as sodium azide as a basis for the generation of a gas mixture for the inflation, for instance of an automobile safety crash bag. In addition, the triazole and tetrazole compounds are relatively nontoxic and therefore much more suitable for use in this application than the azide compounds, which are highly toxic. Thus, the triazole and tetrazole compounds in admixture with said oxidizer compounds require less special handling in the manufacture, storage and eventual disposal than is the case with the gas generants prepared from azide compounds which are toxic.

An especially useful oxidizer compound is a mixture of ammonium perchlorate and sodium nitrate in a 1 to 1 mole ratio so that the sodium and chlorine combine during combustion to form the harmless sodium chloride. An excess of chlorine must be avoided since toxic gases such as hydrogen chloride would be formed. A small excess of sodium can be tolerated since it would result in the formation of sodium carbonate. Other useful oxidizing compounds are salts such as the ammonium, alkali metal, and alkaline earth metal nitrates and perchlorates. The proportion of gas generant compound utilized in admixture with an oxygen containing oxidizer is generally about 20 to about 65 wt. % of tetrazole or triazole compound in combination with about 35 to about 80% by wt. of said oxidizer.

In general, the ratio of oxidizer to the tetrazole or triazole compound must be adjusted to provide an excess of oxygen after all carbon and hydrogen have been oxidized to form carbon dioxide and water. The amount of excess oxygen required is about 1 to 25% by volume in the gas formed upon combustion.

By the method of the invention, the primary gas mixture formed upon combustion at elevated pressure of the mixture of said tetrazole or triazole compound and said oxygen containing oxidizer compound is generally diluted with about 1 to about 4 volumes of air, usually about 1 to about 2.5 volumes of air. The amount of dilution of the gas mixture formed upon combustion with air is dependent upon several factors including the temperature of the primary gas mixture, the molecular weight of the primary gas mixture and the design of the aspirator utilized. Any toxic gases in the primary gas mixture upon dilution with air would be decreased by a factor of about 2 to about 5 upon dilution with outside air. The final diluted gas mixture generally contains less than about 16% by volume carbon dioxide, less than about 4% by volume hydrogen, and less than about 50%, preferably less than about 20% by volume of water.

The use of tetrazole compounds such as tetrazole, aminotetrazole, metal salts of tetrazole or aminotetrazole, or other tetrazole salts which contain hydrogen in the molecule in admixture with oxygen containing oxidizer compounds such as potassium perchlorate have been dismissed as unsuitable by workers in the prior art on the basis that such mixtures, when burned, tend to form small amounts of various toxic species (in addition to nitrogen) such as hydrogen cyanide, nitrogen oxides, and carbon monoxide. Nevertheless, such mixtures have been found to be eminently satisfactory, upon dilution with outside air, to inflate a crash bag. Representative useful triazole compounds are 1,2,4-triazole; 1,2,4-triazole-5-one, and 3-nitro-4,5-dihydro-1,2,4,-triazole-5-one.

The use of a gas mixture comprising a primary gas mixture diluted with a secondary gas mixture (air) provides several advantages, namely, the primary gas mixture is cooled substantially by such dilution, thus avoiding the potential for burning the occupants of the aircraft or automobile in which the crash bag is utilized. In addition, the air dilution of the primary gas mixture reduces the level of toxic species present to much lower levels, which are acceptable. Thus the use of tetrazole or triazole compounds containing hydrogen in the molecule is practical, since the concentration of hydrogen in the gas produced can generally be reduced by oxidation to very low levels, generally less than 4% by volume, by the formation of water. In addition, the level of water in the gas mixture can be reduced preferably to about 2% to about 20% by volume, depending upon the gas generant composition used.

Using hydrogen containing tetrazoles and triazoles as gas generant compounds is particularly advantageous in conjunction with a system in which outside air is aspirated so as to form a mixture with the gas generated by combustion of the hydrogen containing tetrazoles and triazoles in that water is formed in the combustion of the tetrazoles and triazoles. Water has a low molecular weight and is non toxic. A low molecular weight in the gases formed upon combustion is especially desirable in a system in which aspiration of outside air is utilized. The level of carbon dioxide can be reduced to less than about 1% to about 5% by volume, an entirely acceptable level in this application. The hydrogen cyanide, nitrogen oxides, and carbon monoxide levels obtained are also acceptable.

In order to prepare the gas generating compositions utilized in the process of the invention, the components, for instance, the sodium salt of tetrazole, and the oxygen and chlorine containing oxidizer compound, for instance, a mixture of ammonium perchlorate and sodium nitrate, can be dry blended as powders by standard methods. The components can also be blended with other additives for burning rate improvement or adjustment and for improving the propellant grain processing properties. The blended powder can, if desired, be compressed into granules, or pellets by conventional techniques. Since the components of the gas generating composition used in the process of the invention are not highly toxic or highly reactive and ignite only at elevated pressure, special handling techniques, beyond those required in the use of ordinary solid propellants (to minimize exposure because of toxicity or contamination which might increase reactivity) are not required in the fabrication of the gas generating compositions used or in the pelletizing thereof.

One skilled in the art will recognize that at least one of any other alkali metal, an alkaline earth metal or an ammonium salt of a tetrazole containing hydrogen or an alkali metal, an alkaline earth metal, or an ammonium salt of an aminotetrazole or a triazole can be substituted for the metal salt in the below Examples or, alternatively, a hydrogen containing tetrazole, aminotetrazole, or triazole compound can be utilized per se in admixtures with an oxygen containing, preferably an oxygen and chlorine containing oxidizing compound in the preparation of granules or pellets by conventional techniques. The oxidizing compound is exemplified by an alkali metal or alkaline earth metal nitrate or perchlorate or mixtures of alkali metal or alkaline earth metal nitrates with ammonium perchlorates. One skilled in the art will also recognize that catalysts or combustion rate modifiers can be used or added in addition to the oxygen containing oxidizing compound described above. Thus, additional catalyst compounds such as vanadium pentoxide, copper oxide, and iron oxide may be substituted or added to the mixture to be pelletized.

Preferably, an oxidizer compound or oxidizer compound mixture can be selected which will result in complete conversion of any metal (whether contained in the oxidizer or in the combustion compound used as fuel) to the chloride salt. Thus, a metal salt such as the sodium salt of tetrazole can be reacted with an equimolar quantity of ammonium perchlorate in order to convert all of the sodium to sodium chloride. In order to provide the additional oxygen required to oxidize the carbon to carbon dioxide and the hydrogen to water, an oxidizer balanced to produce metal salt can be used. For example, an equimolar mixture of ammonium perchlorate and sodium (or potassium) nitrate can be used. Alternatively, a metal perchlorate or chlorate can be used such as potassium perchlorate.

Ammonium perchlorate, although a good oxidizer, is not useful as the sole oxidizer since it will produce hydrogen chloride or other toxic products if not balanced by the presence of a metal such as sodium or potassium, Alkali metal nitrates such as sodium or potassium nitrate can be used without a chlorine containing oxidizer but the products obtained upon combustion must be carefully evaluated in order to avoid disadvantageous results. In general, a metal carbonate such as sodium carbonate can result by the use of an alkali metal nitrate. The formation of such a salt is disadvantageous because, in the formation of said salt, carbon dioxide is removed as a component from the gases formed upon combustion. Carbon dioxide is a useful gas for inflating a crash bag since it has a relatively low toxicity. In addition, if not enough carbon dioxide is available in the gas formed upon combustion, then other hazardous products can be formed such as sodium or potassium oxide.

It is believed that the use of oxidizers which are balanced to produce a metal chloride salt, particularly, a sodium or potassium chloride salt, result in an additional safety advantage as compared with the use of oxidizer compounds which do not produce a metal chloride salt because the gas generants prepared from such oxidizers in combination with the tetrazole compounds disclosed as useful in the process of the invention burn with difficulty (if at all) at atmospheric pressure but burn vigorously at elevated pressures. This unexpected result is not fully understood but it is assumed that the salt vapor formed during combustion quenches the flame at low pressures but not at higher pressures.

Although many satisfactory ignition mechanisms will occur to one skilled in the art, a particularly convenient and preferred igniter composition consists of a mixture of boron and potassium nitrate which is well known to those skilled in the art as $BKNO_3$. Other ignitor compositions such as mixtures of potassium perchlorate, ammonium perchlorate, and aluminum powder are also suitable. Firing of the ignitor composition may be accomplished utilizing standard electrical means including any desired safety devices in the circuitry, such as spark gaps and/or ferrite resistors to prevent unwarranted initiation from strong radio frequency or high voltage sources.

The process of the invention can utilize conventional gas generator mechanisms of the prior art. These are referred to in U.S. Pat. No. 4,369,079, incorporated herein by reference. Other more suitable gas generating devices are envisioned. Generally, the methods of the prior art involve the use of a hermetically sealed metallic cartridge containing the pyrotechnic material, the oxygen containing oxidizer, and an initiator. Upon initiation of combustion by the firing of a squib, the sealing mechanism ruptures. This allows gas to flow out of the combustion chamber through several orifices and into an aspirating venturi through which outside air is drawn into he gas formed upon combustion so that the gas utilized to inflate the airbag is a mixture of outside air (secondary gas source) and the gaseous mixture formed upon ignition (primary gas source) which together constitute the total amount of inflation gas.

When utilizing the gas generating compositions described above, a less efficient filter is required than when toxic solids are generated because the solids formed upon combustion in the process of the invention are generally considered to be nontoxic and consist, for example, of solids such as sodium chloride, sodium carbonate, and potassium chloride. Such solids of low toxicity are generally referred to as nuisance particulates.

The following Examples illustrate the various aspects of the invention but are not intended to limit its scope. Where not otherwise specified throughout this specification and claims, temperatures are given in degrees centigrade and parts, percentages, and proportions are by weight except for gases in which case percentages are by volume.

EXAMPLE 1

A mixture of the sodium salt of tetrazole, ammonium perchlorate, and sodium nitrate was prepared having the following composition in percent by weight 34% sodium salt of tetrazole; 38.3% ammonium perchlorate; and 27.7% sodium nitrate. These powders were dry blended and pellets were prepared by compression molding. The pellets would not sustain combustion upon repeated ignition at atmospheric pressure using a propane-oxygen torch but, continued burning when ignited under a helium pressure of 300 psi. Subsequent burning rate measurements at a pressure of 1000 psi. indicated a burning rate of about 2 inches per second. The combustion temperature of this mixture is theoretically 3345° F. The primary gas composition produced upon combustion contained 45.4% wt. of nitrogen, 9% by wt. of carbon dioxide, 34.5% of water, and 11.1% by wt. of oxygen. The solid residue formed upon combustion consisted of sodium chloride and sodium carbonate. When this primary gas composition is diluted with 2.5 volumes of air to each volume of the primary gas produced upon combustion, the water content of the mixture is reduced to 9.9% by volume and the carbon dioxide content of the mixture is reduced to 2.6% by volume.

EXAMPLE 2

A mixture of 5-aminotetrazole, ammonium perchlorate, and sodium nitrate was made by dry blending and pellets were formed upon compression molding. The percent by weight composition of the mixture was: 34% 5-aminotetrazole; 38.3% ammonium perchlorate; and 27.7% of sodium nitrate. The pellets would not sustain combustion at atmospheric pressure but burn completely when pressurized to 300 psi with helium. The burning rate measured at 1000 psi. was 0.53 inches per second. The combustion temperature is theoretically 4300° F. and the primary gas composition produced upon combustion contains 42.9% by volume nitrogen, 12.9% by volume carbon dioxide, 40.3% by volume water, and 3.7% by volume oxygen. The solid residue produced upon combustion was sodium chloride. Upon dilution with air at a ratio of 2.5 to 1 a water content of 11.5% by volume is obtained and a carbon dioxide content of 3.7% by volume is obtained.

EXAMPLE 3

The mixture described in Example 2 was modified by addition of 0.5% by weight of iron oxide ($Fe_2O_3$). The final composition used in percent by weight was: 34% 5-aminotetrazole, 38.05% ammonium perchlorate, 27.45% sodium nitrate, and 0.5% iron oxide. This mixture was dry blended and pellets were formed by compression molding. The pellets when ignited at atmospheric pressure continued to burn slowly. The burning rate measured at 1000 psi. was found to be 0.77 inches per second.

EXAMPLE 4

A mixture as described in Example 3 was prepared except that vanadium pentoxide ($V_2O_5$) was substituted for iron oxide. The mixture was dry blended and pellets were formed by compression molding. The pellets continued to burn slowly when ignited at atmospheric pressure. The burning rate measured at 1000 psi. was found to be 0.56 inches per second.

EXAMPLE 5

A mixture of 40% by weight of the sodium salt of tetrazole, 49.7% by weight of sodium nitrate, and 10.3% by weight of silicon dioxide was dry blended and pellets were formed by compression molding. When ignited at atmospheric pressure, the pellets burned completely and very rapidly. The burning rate measured at 1000 psi. was found to be 1.5 inches per second. The combustion temperature of this mixture is theoretically 3432° F. and the primary gas composition produced at combustion contains 72.2% by volume nitrogen, 6% by volume carbon dioxide, 16.9% by volume water and 4.9% by volume oxygen. The solid products formed upon combustion consist of sodium carbonate and sodium silicate. When the primary gas composition is diluted with 2.5 volumes of air to each volume of primary gas formed, the water content of the diluted mixture is 4.8% by volume and the carbon dioxide content is 1.7% by volume.

EXAMPLE 6

A mixture of 30% by weight of 1,2,4-triazole-5-one, 40.4% by weight ammonium perchlorate, 29% by weight sodium nitrate, and 0.5% by weight vanadium pentoxide was dry blended and pellets were formed by compression molding. When ignited at atmospheric pressure, the pellets continued to burn slowly. The burning rate measured at 1000 psi. was found to be 0.37 inches per second. The theoretical combustion temperature of this mixture is 4309° F. and the primary gas composition produced at combustion contains 30.5% by volume nitrogen, 24.6% by volume carbon dioxide, 42.5% by volume water, and 2.4% by volume oxygen. The solid product formed by combustion is sodium chloride. When the primary gas is diluted with 2.5 volumes of air to each volume of primary gas, the water content is reduced to 12.2% by volume and the carbon dioxide is reduced to 7% by volume.

While this invention has been described with reference to certain specific embodiments, it will be recognized by those skilled in the art that many variations are possible without departing from the scope and spirit of the invention, and it will be understood that it is intended to cover all changes and modifications of the invention disclosed herein for the purposes of illustration, which do not constitute departures from the spirit and scope of the invention.

The embodiments of the invention in which an exclusive property or privilege is claimed are defined as follows:

1. A method for inflating an automobile or aircraft safety crash bag comprising the combustion of a pyrotechnic material, comprising at least one tetrazole or triazole compound containing hydrogen in the molecule, to generate substantially non-toxic combustion products including a gas to inflate said crash bag, said method comprising:

A. burning said pyrotechnic material at elevated pressure in admixture with at least one oxygen containing oxidizer compound and at least one additional material so as to produce, upon combustion, a metal chloride salt and a substantially non-toxic primary gas mixture and B. diluting said primary gas mixture with air to produce a substantially non-toxic final gas mixture by passing said primary gas mixture through at least one venturi so as to aspirate said air, whereby said crash bag, when inflated contains a final gas mixture comprising about one to about four volumes of air per volume of said primary gas mixture.

2. The method of claim 1 whereby said final gas mixture comprises less than about four percent by volume of hydrogen and less than about 16% by volume of carbon dioxide.

3. The method of claim 2 whereby combustion of said pyrotechnic material results in the production of non-toxic solids which need not be filtered out of the gas produced.

4. The method of claim 3 whereby said oxygen containing oxidizer compound is selected from at least one of the group consisting of alkali metal, alkaline earth metal and ammonium oxygen containing oxidizer salts.

5. The method of claim 4 whereby said tetrazole compound is selected from the group consisting of a hydrogen containing tetrazole, an aminotetrazole, metal salts thereof, and mixtures thereof.

6. The method of claim 5 whereby said oxygen containing oxidizer compound is selected from at least one of the group consisting of alkali metal, alkaline earth metal, and ammonium nitrates or perchlorates.

7. The method of claim 6 whereby said tetrazole compound is an alkali, metal alkaline earth metal or ammonium salt of a hydrogen containing tetrazole which is present in a concentration of about 20 to about 65 wt. % and said oxygen containing oxidizer compound is present in an amount of about 35 to about 80 wt. %.

8. The method of claim 7 whereby said primary gas mixture is diluted with about 1 to about 2.5 volumes of air per volume of said primary gas mixture.

9. A gas mixture suitable for inflating an automobile or aircraft safety crash bag prepared by the process of claim 1.

10. An aircraft or automobile safety crash bag inflated with a gas mixture prepared by the process of claim 1.

11. A pyrotechnic material useful to generate substantially non-toxic combustion products including a gas to inflate a crash bag, said pyrotechnic material comprising at least one tetrazole compound containing hydrogen in the molecule or a triazole compound containing hydrogen in the molecule, in admixture with at least one oxygen containing oxidizer compound and at least one additional material so as to produce, upon combustion, a substantially non-toxic gas and a metal chloride salt.

12. The composition of claim 11 wherein said oxygen containing oxidizer compound is selected from at least one of the group consisting of alkali metal, alkaline earth material, and ammonium oxygen containing oxidizer salts.

13. The composition of claim 12 wherein said tetrazole compound is selected from the group consisting of a hydrogen containing tetrazole, an amino tetrazole, metal salts thereof, and mixtures thereof.

14. The composition of claim 13 wherein said oxygen containing oxidizer is selected from at least one of the group consisting of alkali metal, alkaline earth material, and ammonium nitrates or perchlorates.

15. The composition of claim 14 wherein said oxygen containing oxidizer compound is present in said pyrotechnic material in an amount which will result in said gas, produced upon combustion, comprising about 1 to about 25% oxygen.

16. The composition of claim 15 wherein said tetrazole compound is an alkali metal, an alkaline earth metal or ammonium salt of a hydrogen containing tetrazole which is present in a concentration of about 20 to about 65% by weight and said oxygen containing oxidizer compound is present in an amount of about 35 to about 80% by weight.

17. The composition of claim 16 wherein said pyrotechnic material comprises about 34% 5-aminotetrazole, about 38% ammonium perchlorate, about 27% sodium nitrate, and about 0.5% iron oxide.

* * * * *